United States Patent [19]

Lichtin et al.

[11] Patent Number: 4,861,484

[45] Date of Patent: Aug. 29, 1989

[54] CATALYTIC PROCESS FOR DEGRADATION OF ORGANIC MATERIALS IN AQUEOUS AND ORGANIC FLUIDS TO PRODUCE ENVIRONMENTALLY COMPATIBLE PRODUCTS

[75] Inventors: Norman N. Lichtin, Newton Center, Mass.; Thomas M. DiMauro, New York, N.Y.; Richard C. Svrluga, Brookline, Mass.

[73] Assignee: Synlize, Inc., Brookline, Mass.

[21] Appl. No.: 163,341

[22] Filed: Mar. 2, 1988

[51] Int. Cl.$^4$ .................. C02F 1/30; B01D 15/00
[52] U.S. Cl. .................. 210/638; 210/674; 210/677; 210/694; 210/748; 210/759; 210/763; 210/908; 502/29; 502/518
[58] Field of Search ............ 210/638, 639, 674, 694, 210/748, 759, 763, 762, 908–910, 677; 502/22–24, 28–33, 514, 518

[56] References Cited

U.S. PATENT DOCUMENTS

| 3,274,104 | 9/1966 | Hamilton ........................ 210/674 |
| 3,844,914 | 10/1974 | Murchison ..................... 210/748 |
| 3,887,490 | 6/1975 | Schreyer et al. ............... 502/33 |
| 4,012,321 | 3/1977 | Koubek ........................... 210/748 |
| 4,026,795 | 5/1977 | Okamoto et al. ............... 502/33 |
| 4,153,761 | 5/1979 | Marsh ............................. 210/759 X |
| 4,186,085 | 1/1980 | Savage ........................... 210/694 X |
| 4,294,703 | 10/1981 | Wilms et al. ................... 210/759 X |
| 4,415,456 | 11/1983 | Chandler, Jr. ................. 210/694 X |
| 4,661,256 | 4/1987 | Johnson ......................... 210/674 X |
| 4,751,005 | 6/1988 | Mitsui et al. ................... 10/759 |

*Primary Examiner*—Tom Wyse
*Attorney, Agent, or Firm*—David Prashker

[57] ABSTRACT

A novel catalytic process is provided for the controlled degradation of organic materials into environmentally compatible products comprising at least carbon dioxide. The process employs a solid catalyst comprising at least one transition element and a peroxide to form a reaction mixture with the organic material which is degraded in the presence of photoenergy absorbable by the catalyst. The catalytic process has multiple applications including the purification of organic solvents; the regeneration of granular activated carbon; the purification of potable water and industrial waste water; and the elimination of organic hazardous and/or toxic substances from collected wastes.

34 Claims, No Drawings

CATALYTIC PROCESS FOR DEGRADATION OF ORGANIC MATERIALS IN AQUEOUS AND ORGANIC FLUIDS TO PRODUCE ENVIRONMENTALLY COMPATIBLE PRODUCTS

FIELD OF THE INVNENTION

The present invention is directed to catalytic processes and reaction methods for the controlled degradation of organic materials present in aqueous and organic fluids such that environmentally compatible reaction products are yielded; and is particularly concerned with the applications of these catalytic processes for the elimination of hazardous organic materials from organic solvents, from potable water, from industrial waste water, from contaminated soil or sludge, and for the chemical regeneration of adsorbants such as granular activated carbon.

BACKGROUND OF THE INVENTION

Consumer and industrial waste management has become one of the most serious and urgent problems of modern life. The severity of the problem is staggering and many proposed solutions are in direct conflict with health and safety standards for the public and with laws and policies protecting the environment. In essence, the problem may be summarized as follows: How does one treat or dispose of human and industrial waste products, natural and synthetic organic materials in the main, without further polluting air, water, and soil; and without creating additional risks and hazards caused by the formation and release of toxic and/or hazardous substances which often are more dangerous to the public than the original waste materials themselves. The problem becomes even more complex and difficult after recognizing the variety of organic material found in waste products; and after appreciating the range of sources of organic materials which contribute to the waste problem overall.

For example, human body waste and food consumption create sewage and water pollution. Industrial manufacturing processes contribute highly toxic, often carcinogenic, organic materials including organic solvents and hazardous by-products from manufacturing operations and chemical compositions used by other businesses and industries as raw materials - many of which are neither biodegradable nor environmentally safe.

The most common solutions to date have been and remain either land disposal or burning of the organic waste material in open-air or closed incinerators. For example, the granular activated carbon (hereinafter "GAC") used as filter material for the purification of potable water and industrial waste water is most commonly regenerated by thermal volatilization in which the organic materials previously adsorbed onto the surface of the GAC are desorbed by volatilization and oxidation at high temperature. This thermal regeneration technique is typically characterized by the loss of GAC due to oxidation and attrition; and by the cost of energy in heating the GAC to temperatures of about 800°-850° C. The thermal volatilization technique has major drawbacks which include: often incomplete destruction of the organic material; the disposal of the incinerated products, if they are not released into the environment at large; the release of toxic products of partial combustion which when volatilized become health hazards for the employees and the public; and the general limitation of being a process dedicated to thermal destruction of the organic material.

Clearly for these reasons, other approaches to in-situ regeneration of GAC as well as to degrading organic materials found in aqueous solutions or suspensions, in organic solvents, and in soil contaminated with gasoline or other organic materials have been investigated.

Current approaches for degrading or destroying organic materials (also termed "mineralizing" by some workers) have, in the main, followed three divergent approaches. The first is application-oriented and seeks practical means for chemical regeneration of exhausted filter adsorption matter, most often exhausted granular activated carbon. These investigations utilize conventional liquid solvents to desorb the organic material retained by the GAC filter and focus primarily on the ability of various solvents, aqueous and organic, to extract organic materials such as substituted benzene and phenol compounds from exhausted GAC [Posey and Kin, *J. WPCF* 59:47–52 (1987); Martin and Ng, *Water Res.* 18:59–73 (1984); Martin and Ng, *Water Res.* 19:1527–1535 (1985); Crittenden et al., *Jour. AWWA*:7-4–84 (1987)]. It will be noted and appreciated that the single goal of this general approach is to provide regenerated GAC; there is little or no interest and attention to the question of how to dispose of the liquid solvent after the solvent has desorbed the organic materials and regenerated the adsorbant filter matter.

The second general approach is also application-oriented and is intended primarily for treating domestic water sources for the removal of hazardous natural and/or synthetic organic compounds which are present in relatively low concentration levels, typically 50–500 parts per billion. A constant requirement and characteristic of this approach is the use of an ultraviolet light initiated reaction in combination with a chemical oxidizing agent for the degradation of the hazardous organic compounds in the water. Either ozone gas or hydrogen peroxide is used as the chemical oxidizing agent.

If ozone gas is employed as the oxidizing agent, the gas must be generated where it will be used because ozone is an unstable gas; freshly generated ozone will react in the presence of ultraviolet light with organic compounds to yield a wide diversity of oxidized carbon-containing reaction products, most often peroxides and hydroxyl derivatives of the hazardous organic compounds present initially. In addition, the rate of reaction is often dependent on ultraviolet light intensity. Representative publications describing this technique include William H. Glaze, *Environ. Sci. Technol.* 21:224–230 (1987); Masten and Butler, *Ozone Science and Engineering* 8:339–353 (1987); Peyton and Glaze, "Mechanism of Photolytic Ozonation," in *Photochemistry of Ennvironmental Aquatic Systems*, American Chemical Society, 1987, pages 76–88.

Alternatively, if hydrogen peroxide is employed as the chemical oxidizing agent in combination with ultraviolet light, a variety of smaller molecular weight organic compounds have been degraded partially or completely—if present initially in relatively low concentration. Major differences in the ability to degrade chemically similar compositions have been noted; and complete destruction of hazardous organic materials can occur after reaction with only simple aliphatic compounds. Representative of this technique are the publications of: Sundstrom et al., *Hazardous Waste and Hazardous Materials* 3:101–110 (1986); Weir et al., *Hazard-* ous *Waste and Hazardous Materials* 4:165-176 (1987); Koubek, E., *Ind. Eng. Chem. Proc. Res. Dev.* 14:348 (1975); Malaiyandi et al., *Water Research* 14:1131 (1980); Clarke and Knowles, *Effluent and Water Treatment Journal* 22:335 (1982).

The third general approach is far more theoretical and research oriented. It focuses upon the photopromoted catalytic degradation of organic material in aqueous suspensions or solutions and in fluid mixtures of water and organic solvents All of these investigations utilize molecular oxygen [$O_2$] as an oxidizing agent in the form of oxygen saturated or aerated water in combination with a solid catalyst, most often a semi-conductor transition element oxide in powder form. This reaction process, often termed "heterogeneous photocatalysis," utilizes a continuously illuminated, photoexcitable solid catalyst to convert reactants adsorbed on the photocatalyst surface. These photocatalysts are semi-conductors which are believed to bring the reactants in the fluid into contact with electrons and/or positive holes which are generated within the solid by photons of energy higher than the band-gap of the solid catalyst [Teichner and Formenti, "Heterogeneous Photocatalysis," *Photoelectrochemistry, Photocatalysis, And Photoreactors* (M. Schiavello, editor), D. Reidel Publishing Company, 1985, pages 457-489]. These investigations are particularly concerned with purification of drinking water supplies and the aquatic environment; and seek to degrade organic materials such as organo-chlorine compounds in aqueous suspensions or solutions. A representative listing of recent experiments is provided by: Matthews, R. W., *Wat. Res.* 20:569-578 (1986); Matthews, R. W., *J. Catal.* 97:565 (1986); Okamoto et al., *Bull. Chem. Soc. Jpn.* 58:2015-2022 (1985); Pruden and Ollis, *Environ. Sci. Technol.* 17:628-631 (1983); Ollis et al., *J. Catal.* 88:89-96 (1984); Ollis, D. F., *Environ. Sci. Technol.* 19:480-484 (1985); Chang and Savage, *Environ. Sci. Technol.* 15:201-206 (1981); Tokumaru et al., "Semiconductor-Catalyzed Photoreactions Of Organic Compounds," *Organic Phototransformations In Nonhomogeneous Media* (Marye Anne Fox, editor), American Chemical Society, Washington, D.C., 1985, pages 43-55; Pelizzetti et al., *La Chimica El' Industria* 67:623-625 (1985); R. L. Jolley, "Waste Management Trends: The Interface Of Engineering With Chemistry And Toxicological Monitoring," Abstracts of the 193rd National Meeting of the American Chemical Society, Apr. 5-10, 1987. These publications demonstrate and describe the often conflicting and sometimes contradictory state of knowledge and understanding regarding the capabilities and control of photocatalytic oxidation of different organic materials in aqueous suspensions using molecular oxygen as an oxidizing agent. Clearly, there are explicit questions regarding the activity of the metal oxide catalyst employed, for instance between highly active and less active forms of titanium dioxide. In addition, there are continuing discrepancies and contradictions as to whether photocatalytic oxidation using molecular oxygen as an oxidizing agent can provide total degradation of all classes of organic materials with complete conversion to carbon dioxide and other products. There are multiple reports in the literature giving data on the partial oxidation of organic materials without complete degradation into carbon dioxide [Carey et al., *Bull. Envir. Contam. Toxic.* 16:697-701 (1976); Oliver et al., *Envir. Sci. Technol.* 13:1075-1077 (1979); Hustert et al., *Chemosphere* 12:55-58 (1983); Ollis et al., *J. Catal.* 88:89 (1984)]. There are also other articles stating that some common, organic contaminants in water are completely mineralized in the presence of a titanium dioxide catalyst illuminated with near-ultraviolet light [Barbeni et al., *Nouv. J. de Chim.* 8:547 (1984); Barbeni et al., *Chemosphre* 14:195-208 (1985); Matthews, R. W., *J. Catal.* 97:565 (1986) and Water Res. 20:569-578 (1986)]. Clearly, the current state of knowledge and expectations in this area are in flux and require reconciling a variety of opposing and contrary views.

Despite the existence of these technical and research developments, there has been no attempt to integrate and consolidate these divergent approaches and investigative efforts; nor has there been any recognition or appreciation that a single catalytic process might be suitable for a wide variety of different applications. Moreover, while aqueous suspensions and fluids have been the subjects of multiple investigations and research efforts, there has been comparably little effort expended towards degrading organic materials in organic solvents and fluids—whether for regeneration of solvents or for degradation of organic materials in an environmentally compatible manner. Clearly, therefore, a catalytic process which will completely degrade organic materials generally in a reliable manner in both organic and aqueous fluids would be recognized and appreciated as a major advance and substantive improvement over presently known and available techniques.

SUMMARY OF THE INVENTION

The present invention provides a catalytic process for the degradation of organic materials into environmentally compatible products, this process comprising the steps of: obtaining the organic material to be degraded in a water-containing fluid state; and combining the fluid organic material with a solid catalyst comprising at least one transition element and a peroxide as a reaction mixture in the presence of photoenergy absorbable by the solid catalyst to yield environmentally compatible reaction products comprising at least carbon dioxide.

The process may be utilized with all aqueous fluids and suspensions and with organic solvents containing at least 0.5 percent water by volume. The present invention has a plurality of applications and uses as a catalytic process for elimination of hazardous and/or toxic solutes from organic solvents containing dissolved or dispersed hazardous and/or toxic organic material; as an environmentally compatible process for regeneration of granular activated carbon from exhausted, granular activated carbon containing water and organic material; as an environmentally compatible process for purifying potable water and industrial waste water; and for eliminating hazardous and/or toxic organic materials from soil, sludge, and from collected wastes.

DETAILED DESCRIpTION OF THE PREFERRED EMBODIMENTS

The present invention is a catalytic process for the controlled degradation of one or more organic materials into environmentally compatible reaction products comprising at least carbon dioxide. In its most general form, this catalytic process comprises three steps: obtaining the organic material to be degraded in a water-containing fluidized state; and combining the fluid organic material with a solid catalyst comprising at least one transition element and a peroxide as a reaction mixture and; adding photoenergy to the reaction mixture to yield environmentally compatible reaction products comprising at least carbon dioxide. The photoenergy is preferably in the visible or ultraviolet light ranges which is absorbable by the solid catalyst.

Despite the superficial simplicity of the present invention in its most general definition, this unique catalytic process provides a number of major advntages and unexpected benefits for its users. These include:

(1) The reaction products produced by the present catalytic process provide environmentally compatible reaction products which can be released directly into the ambient environment or easily controlled and quickly disposed in an environmentally safe manner. In most instances, the reaction products will be gaseous in form and will include carbon dioxide, HX wherein X is a halide, water, and some nitrogen containing compositions such as ammonia or various nitrogen oxides. Such environmentally compatible, easily neutralized or otherwise containable reaction products eliminate the present dangers of releasing hazardous, toxic, or biologically non-degradable materials into the air, water, and soil as is often the present practice with waste disposal management methods today.

(2) The catalytic process of the present invention is able to provide complete degradation of organic materials generally. Unlike methods previously known in this art, this general catalytic process will completely degrade aromatics, alkanes, alkenes, aryl alkanes, aryl halides, alkyl halides, alkyl aryl halides and their derivatives into environmentally compatible reaction products comprising at least carbon dioxide; and often water, hydrogen halides, and nitrogen containing compounds. In comparison, organic solvents and fluids which are demonstrably resistant to catalytic degradation by a solid catalyst containing at least one transition element and a peroxide in combination may be purified of one or more organic materials by the present invention.

(3) The novel method provided herein is unique in its ability to degrade large quantities and high concentrations organic pollutants in a fluid state into carbon dioxide and other environmentally compatible products regardless of whether these organic materials are in the form of fluid bulk matter, suspensions, colloidal dispersions, or true solutions. Unlike conventionally known irradiation techniques employing either molecular oxygen or hydrogen peroxide alone, the present invention is not limited in its applicability to only very dilute solutions (e.g., parts per billion levels) of pollutants. This capability is empirically documented hereinafter and satisfies a generally recognized and longstanding need in this art.

(4) The present invention also allows for purposeful concentration and degradation of hazardous and/or toxic organic materials in aqueous fluids at concentration levels never before possible. An improvement provided by the present methods utilizes detergent-emulsified aqueous dispersions of organic pollutants which permits concentrations of hazardous and/or toxic organic materials to be prepared which are between ten and one thousand times the concentrations accessible by dissolution in water in the absence of detergent. Degradation of such high concentrations of detergent-emulsified organic materials using the unique method proceeds at rapid rates and yields carbon dioxide and other environmentally compatible reaction products in large quantities. Moreover, the mineralization reaction continues for an unexpectedly prolonged period of time in comparison to conventionally known methods. Each of these capabilities is empirically described hereinafter.

(5) The catalytic process of the present invention intends and expects that the organic material to be degraded be in a water-containing fluid. The water required for the catalytic mechanism to proceed is minimal and a quantity ranging substantially from 0.5% of water by volume is all that is required for the process to be operative. Accordingly, the fluid containing the organic material to be degraded may contain more than 99% organic matter; and it is desirable that organic solvents be employed at a concentration of 99% by volume as the carrier fluid in many applications. Alternatively, the carrier fluid may be up to 100% aqueous in composition at the other extreme. However, it is believed that mixtures of water and one or more organic solvents will commonly be combined in useful or desired proportions and ratios as the water-containing fluid required by the present invention.

(6) The catalytic process of the present invention is intended to be utilized at ambient temperature. It is expected that the ambient temperature will vary within the extremes considered normal in the temperate zone, that is, substantially in the range from 32°–100° F. Alternatively, however, the catalytic process may be employed at elevated temperatures if this is desired or required under specific conditions and use circumstances.

(7) No chemical pretreatment whatsoever of the organic material to be degraded is required. This absence of pretreatment applies equally to both the organic materials themselves and to other materials such as adsorbents upon which the organic materials may be initially deposited and/or adsorbed. Neither the organic material nor the adsorbent matter need be pretreated or chemically broken down in order to utilize the present invention.

The broadly defined catalytic process of the present invention may be usefully employed in multiple applications directly or by elaboration upon the minimal manipulative steps of the general process. For example, the catalytic process may be employed for the purification of an organic solvent containing dissolved organic material, this process comprising the steps of: obtaining an organic solvent containing solubilized organic material as a water-containing fluid; and combining the water-containing fluid with a solid catalyst comprising at least one transition element and a peroxide as a reaction mixture in the presence of photoenergy absorbable by the solid catalyst to yield a substantially purified organic solvent and environmentally compatible reaction products comprising at least carbon dioxide.

Alternatively, the present invention provides an environmentally compatible process for regenerating granular activated carbon from exhausted granular activated carbon containing organic material, this process comprising the steps of: mixing the exhausted granular activated carbon with an organic solvent such that the organic material becomes dissolved in the organic solvent and granular activated carbon is regenerated in a form substantially free of adsorbed organic material; separating the regenerated granular activated carbon from the organic solvent containing dissolved organic material; and combining the separated organic solvent with a solid catalyst comprising at least one transition element and a peroxide as a reaction mixture; and adding photoenergy absorbable by the solid catalyst to the reaction mixture to yield an organic solvent substantially free of dissolved organic material and environmentally compatible reaction products comprising at least carbon dioxide.

Alternatively, the present invention may be employed in two different ways as an environmentally compatible process for purifying potable water and industrial waste water. The first water purification process comprises the steps of: obtaining water polluted with organic material; and combining said polluted water with a solid catalyst comprising at least one transition element and a peroxide as a reaction mixture; and adding photoenergy absorbable by the solid catalyst to the reaction mixture to yield purified water and environmentally compatible reaction products comprising at least carbon dioxide. Alternatively, the second water purification process comprises the steps of: obtaining water polluted with organic material; passing the polluted water through granular activated carbon such that the organic material is substantially adsorbed by the granular activated carbon and the water is substantially purified; mixing the granular activated carbon containing adsorbed organic material with an organic solvent such that the organic material becomes dissolved in the organic solvent and the granular activated carbon is regenerated in a form substantially free of adsorbed organic material; separating the regenerated granular activated carbon from the organic solvent containing dissolved organic material; and combining the separated organic solvent with a solid catalyst comprising at least one transition element and a peroxide as a reaction mixture; and adding photoenergy absorbable by the solid catalyst to yield a purified organic solvent substantially free of organic material and environmentally compatible reaction products comprising at least carbon dioxide.

Finally, the present invention provides an environmentally compatible process for eliminating hazardous organic materials contained in sludges or other solid wastes, or mixed with or absorbed by soil. This process comprises the steps of: extracting the sludge, solid waste, or soil with an organic solvent or with water containing one or more detergents to produce a fluid containing the hazardous organic materials; and combining said fluid with a solid catalyst containing at least one transition element and a peroxide as a reaction mixture; and adding photoenergy absorbable by the solid catalyst to the reaction mixture to yield environmentally compatible reaction products comprising at least carbon dioxide.

In order to more easily understand and better appreciate the environmentally compatible catalytic process comprising the subject matter as a whole of the present invention, it is useful to describe the details of the reactants and the reaction conditions individually followed by representative empirical examples which illustrate the variety of advantages and different applications with which the present invention may be gainfully employed.

Organic Material Able To Be Completely Degraded

The organic material able to be degraded by the present invention is at least one, and typically a mixture of different organic compositions in admixture. The source of the organic material is expected to be waste including: human and industrial waste products; toxic and non-toxic chemical compositions; environmentally hazardous and non-hazardous substances; organic solids, sludges, liquids, and/or gases which are suspended, dispersed, or dissolved in a fluid; synthetic materials including polymers such as nylon polyvinylchloride, polyethylene, polypropylene, and polystyrene; and mixtures of inorganic matter (such as earth, sand, or clay), granular activated carbon, and organic materials in combination as disposable or regenerable blends. A diverse and varied range of chemical compositions are included within the general class of organic material to be completlly degraded. These include relatively low molecular weight saturated organic substances such as alkanes, substituted alkanes without limitation, and related polymeric materials. In addition, higher molecular weight unsaturated compounds including arenes, aryl alkanes and their derivatives, aryl halides, aryl alkyl halides, olefins and haloolefins, and related polymeric materials are completely degraded by the present catalytic process. A representative, but non-exhaustive listing of different kinds and types of organic material able to be degraded is provided by Table I below.

TABLE I

ALKANES AND THEIR DERIVATIVES
Straight Chain Alkanes (such as octane, decane, and hexadecane)
Branched Chain Alkanes (such as isooctanes)
Cycloalkanes (such as cyclohexane)
ARENES AND THEIR DERIVATIVES
Benzene
Alkylbenzenes (such as toluene and xylenes)
Phenol
Oxygen Substituted and Carbon Substituted Alkylphenols
Aniline
Nitrogen Substituted and Carbon Substituted Alkylanilines
Catechol
Oxygen Substituted and Carbon Substituted Alkylcatechols
Resorcinol
Oxygen Substituted and Carbon Substituted Alkylresorcinols
Cresols
Oxygen Substituted and Carbon Substituted Alkylcresols
Hydroquinone
Oxygen Substituted and Carbon Substituted Alkylhydroquinones
Benzyl Chloride
Alkylbenzyl Chlorides
Chlorobenzenes
Alkylchlorobenzenes
Dichlorobenzenes
Alkyldichlorobenzenes
Polychlorobenzenes
Polychloroalkylbenzenes
Nitrobenzene
Alkylnitrobenzenes
Dinitrotoluenes
Chlorophenols
Oxygen Substituted and Carbon Substituted Alkylchlorophenols
Polychlorophenols
Oxygen Substituted and Carbon Substituted Alkylpolychlorophenols
Diphenylethylene
Stilbenes
Naphthalene
Chloronaphthalenes
Alkylnaphthalenes
Naphthols
Oxygen Substituted and Carbon Substituted Alkylnaphthols
Chloronaphthols
Benzoic Acid
Oxygen Substituted and Carbon Substituted Alkylbenzoic Acids
Salicylic Acid
Oxygen Substituted and Carbon Substituted Alkylsalicyclic Acids
Chlorobiphenyls
Dichlorobiphenyls
Polychlorobiphenyls
Ring-Chlorinated Phenylacetic Acids
Dichlorodiphenyltrichloroethane (DDT)
OLEFINS AND UNSATURATED HALIDES
Simple Alkenes
Alkadienes
Vinyl Chloride

TABLE I-continued

Vinyl Bromide
Dichloroethylenes
Trichloroethylene
Tetrachloroethylene
ALKYLHALIDES
Dichloroethanes and Dibromoethanes
Trichloroethanes and Tribromoethanes
Tetrachloroethanes and Tetrabromoethanes
$CFCl_3$, $CF_2Cl_2$, and Other Chlorofluorocarbons
Methyl Chloride and Methyl Bromide
Methylene Dichloride and Methylene Dibromide
Chloroform and Bromoform
Carbon Tetrachloride and Carbon Tetrabromide
EXAMPLES OF OTHER CLASSES
Chlorinated Dioxins
Chlorinated Dibenzofurans
Trichloroacetic Acid
Alkyl and Aryl Thiocarbamates
Alkyl and Aryl Amines
Alkyl and Aryl Mercaptans
Alkyl and Aryl Thioethers
Polymeric Materials Related to Any or All of the Above Classes Even a cursory reading of Table I will reveal many classes of substances whose members have been classified as toxic, environmentally hazardous compositions by federal and state agencies such as the EPA, OSHA, and NIOSH. In addition, many of these substances are known or believed to be carcinogenic or carcinogen-promoters whose use is carefully controlled by various health and safety agencies. All of these comprise the membership of the general class of organic material able to be completely degraded into environmentally safe reaction products comprising at least carbon dioxide.

The Water-Containing Fluid Carrier

The catalytic process of the present invention requires that the organic material to be degraded be obtained in a water-containing fluid state. Accordingly, if the organic material to be completely decomposed is itself a liquid containing small (0.5–5.0%) amounts of water, the requirement is satisfied. Typically, the organic material is a solid or a mixture of solids and liquids (or gases) in either predominantly organic or aqueous form. Examples of such predominately aqueous fluid mixtures are human waste and sewage; polluted potable water; and industrial waste water. Common predominately organic fluid mixtures include industrial solvent residues; organic fluids used for dry cleaning and water proofing; organic cleansing agents and abstraction fluids in the petroleum industry and refining processes; and organic liquids used as degreasers and solvents for metals and metal deposition in the high technology industries. It will be recognized and appreciated that many of the organic consumer and industrial waste fluids typically contain small amounts of water present inherently or obtained concommittantly as a result of their earlier uses; when these organic fluids contain a minimum of 0.5% water by volume, the water-containing fluid state requirement is met and fulfilled. Accordingly, it will be expressly understood that any organic fluid, regardless of source, which contains substantially 0.5% or more water in which the organic material to be degraded is suspended, dispersed, dissolved, or otherwise carried meets and fulfills the requisite criterion.

It is also intended that the user of the improved methods have the option of purposely increasing the concentration of organic materials to be degraded, particularly when the fluid is aqueous or comprises a substantial (5.0% or greater) volume of water. To achieve greatly increased concentrations of organic pollutants, commonly available water-soluble detergents such as sodium lauryl sulphate are introduced into and mixed with the water present in the fluid to form a detergent-emulsified aqueous dispersion of organic materials to be degraded. Generally, the amount of detergent employed will be in the range from 0.0001–5.0% of the total fluid weight or volume, a 1.0–2.0% level being useful for most applications. It is most desirable that the detergent itself be in liquid form when added to the fluid containing the organic pollutants for ease of admixture. In this manner, fluids containing increased concentrations of organic materials to be degraded can be purposely prepared which are between ten and one thousand times the concentration possible in water in the absence of detergent.

It is expected that a number of different organic solvents individually or in combination may be usefully employed alone or with water as fluid carriers for the organic material to be degraded. In general, it is preferred that the organic solvent be resistant to catalytic degradation by the present process. However, it is also recognized that some organic solvents may be considered useful even if the solvent is degraded in part or in whole. Such would be the case if a particular pollutant is most effectively dissolved and/or decomposed in an organic solvent which is also degraded by the present methodology. The fact that the organic solvent is itself consumed during the process is secondary or insignificant under these circumstances so long as the pollutant is decomposed. A representative listing of useful organic solvents is provided by Table II below.

TABLE II

USEFUL ORGANIC SOLVENTS

Acetonitrile*
N,N—dimethylacetamide*
2,2-dimethylpropionitrile*
Dimethylsulfoxide*
Propionitrile*
Sulfolane*
Acetone
1-butanol
2-butanol
tert-butyl alcohol
N,N—dimethylacetamide
N,N—dimethylformamide
Ethanol
Ethanolamine
Ethyl acetate
Methanol
Methyl acetate
Methyl ethyl ketone
1-propanol
2-propanol
Triethylamine

*Preferred Organic Solvent

It is also expected and intended that these organic solvents will be blended together as required or desired, with or without substantial quantities of water, to yield fluid mixtures. In those instances where the organic solvent mixture or individual organic solvent does not contain the minimal 0.5% water by volume when obtained from the source, it is then necessary to add water to the mixture or individual solvent to achieve the minimal requisite aqueous content (0.5%). It is expected, however, that in the overwhelming majority of use circumstances, the organic solvent containing the organic material to be degraded will already contain at least the minimal amount of water required in order to be termed a fluid in a water-containing state.

The Solid Catalyst Comprising At Least One Transition Element

The catalysts used in the present invention are solids preferably used in a powdered or subdivided form in order to expose a large surface area for reaction. Each solid catalyst contains at least one transition element able to absorb photoenergy of a specified type and wavelength range. Transition elements are those which, as elements or in any of their commonly occuring oxidation states, have partly filled "d" or "f" shells. The reader is presumed to have both knowledge and familiarity of the properties and characteristics of transition elements generally as these are described in F. A. Cotton and G. Wilkinson, *Advanced Inorganic Chemistry*, 4th edition, John Wiley and Sons, New York, 1980—the text of which is expressly incorporated by reference herein. Within this broad class of catalysts, solids containing oxides of transition elements are highly preferred. A representative, but not-inclusive listing of preferred metal oxide catalysts includes those listed in Table III below.

TABLE III
| PREFERRED TRANSITION ELEMENT CATALYSTS |
| --- |
| $TiO_2$ |
| $SrTiO_3$ |
| $BaTiO_3$ |
| $NiTiO_3$ |
| $CoTiO_3$ |
| $RuO_2/TiO_2$ |
| $Pt/TiO_2$ |
| $Pt/SrTiO_3$ |
| $Pt/BaTiO_3$ |
| $ZnO$ |
| $\alpha\text{-}Fe_2O_3$ |
| $\gamma\text{-}Fe_2O_3$ |
| $Pt/Fe_2O_3$ |
| $Fe_2O_3\text{--}Fe_3O_4$ |
| $Sb_2O_5$ |
| $MoO_3$ |
| $WO_3$ |
| Sn—Sb—oxide |
| $La_2O_3$ |
| $Nd_2O_5$ |
| $Pr_6O_{11}$ |
| $Co^{2+}$—Zeolite Y |
| $Fe^{3+}$—Zeolite Y |
| $Ti^{4+}$—Zeolite Y |
| Montmorillonite Clay |
| Monazite Sand |

Of these, titanium dioxide and, in particular, Degussa P25 grade $TiO_2$ is most preferred. Degussa prepared titanium dioxide is primarily in the anatase form (rather than the rutile form) and has been demonstrated to be highly active in the complete degradation of alkanes, arenes, haloalkanes, haloalkenes, haloaromatic phenolics, halophenolics, and other classes of organic compounds into carbon dioxide and other products. The catalysts used in the present process may be selected and used individually or employed in combination as a mixture of two or more catalysts. The preparation of solid catalysts suitable for use in the present catalytic process are conventionally known in the art and may be prepared in accordance with their published methods of preparation or can be commercially purchased from a variety of different suppliers.

Peroxides

A requisite reactant for the catalytic degradation process of the present invention is the use of a peroxide in the reaction mixture. Peroxides generally as a chemical class may be usefully employed within the present invention. Peroxides are chemically defined as compositions having the formula ROOR' wherein R and R' are selected from the group consisting of hydrogen and alkyl, aryl, and organic or inorganic acyl groups. Most preferred for use in the present invention is hydrogen peroxide, HOOH, in concentrations ranging from 0.1–10.0%. Hydrogen peroxide is most preferred because it provides only oxygen atoms and hydrogen atoms for reaction with the organic materials to yield environmentally compatible products. In instances where R and R' are not hydrogen, the reaction products of the present invention remain environmentally compatible but may include other compositions in addition to carbon dioxide. The preferred peroxide reactant, hydrogen peroxide, may be commercially obtained in quantity and in concentrated form from many different sources.

Photoenergy

The present invention is unique in its ability to catalytically degrade organic material in a controlled manner into environmentally compatible reaction products comprising at least carbon dioxide in the presence of photoenergy. As is empirically demonstrated hereinafter, organic materials are degraded at rapid rates and over extended periods of time by combining them with a suitable solid catalyst and a peroxide. As used herein, photoenergy is defined as electromagnetic radiation of any wavelength. It will be appreciated also that the entirety of the catalytic reaction process may be conducted on demand for preset time periods, continuously or cyclically as desired or required by the user.

When photoenergy is added to the reaction mixture, it is the visible and near-ultraviolet light wavelengths absorable by the transition element catalyst which are most effective in enhancing the activity of the catalysts. In the examples which follow herein, it will be recognized that when photoenergy was added to the reaction mixture, such photoenergy was obtained using laboratory scale lamps and illumination devices having a limited and identifiable range of light wavelengths. In larger scale industrial or commercial applications, it is expected that sunlight or artificial light from a variety of different sources may be employed. When such incident photoenergy is added, there is substantial enhancement of organic material degradation per Einstein of incident energy above those obtainable by presently known processes which do not utilize transition element catalysts and peroxides in combination as reactants. In addition, the use of photoenergy provides substantially increased yields of organic material degradation in comparison to those yields obtained by conventionally known processes.

Preferred Reaction Conditions

It is generally preferred that the catalytic process of the present invention be conducted at ambient environmental temperature, that is within the temperature range of the surrounding environment generally presumed to be between 32°–100° F. If desired, however, heat may be added to or removed from the process without substantial change to the general reaction products.

Environmentally Compatible Reaction Products

The catalytic process of the present invention provides complete degradation of organic material into environmentally compatible reaction products which include at least carbon dioxide in every instance. It is expected that the reaction product will evolve partially in a gaseous state and will, in part, become dissolved in the fluid of the reaction medium. Clearly, the exact identity of the reaction products will vary and depend upon the particular chemical composition of the organic material being degraded. Nevertheless, a variety of typical reactions and reaction products which are illustrative of the present invention as a whole are provided by Reactions A-F of Table IV below.

TABLE IV (A) $CCl_4 + H_2O_2 \xrightarrow[h\nu]{TiO_2} CO_2 + HCl$ (B) $H_3C-CH_2-CH_3 + H_2O_2 \xrightarrow[h\nu]{TiO_2} CO_2 + H_2O$ (C) $\begin{array}{c} Cl \\ | \\ C=CH \\ | \ \ | \\ Cl \ \ Cl \end{array} + H_2O \xrightarrow[h\nu]{TiO_2} CO_2 + H_2O + HCl$ (D) 2-chlorophenol $+ H_2O_2 \xrightarrow[h\nu]{TiO_2} CO_2 + H_2O + HCl$ (E) 4-nitrotoluene $+ H_2O_2 \xrightarrow[h\nu]{TiO_2} CO_2 + H_2O + NH_3 + HNO_3$ (F) salicylic acid $+ H_2O_2 \xrightarrow[h\nu]{TiO_2} CO_2 + H_2O$ For illustrative purposes only, the preferred catalyst, Degussa P25 titanium dioxide, and the preferred peroxide, hydrogen peroxide, are employed in each instance.

Because of the variety of organic materials illustratively represented by Table IV, it is useful to briefly summarize each reaction individually. Reaction A represents the complete degradation of organic solvents which are not resistant to decomposition by the present catalytic process. While carbon tetrachloride serves as the immediate example, it is clear that other chloro derivatives of carbon (such as chloroform) and other halide derivatives of carbon will react in a similar fashion to yield carbon dioxide and HCl. Reaction B is representative of saturated hydrocarbons and saturated alkyl derivatives generally. Linear, branched, and cyclic alkanes and alkyl derivatives will also be completely decomposed. Reaction C represents linear and branched olefins in both substituted and non-substituted form. Reaction D illustrates the complete degradation of a halide-substituted aromatic compound and is intended to represent all aryl alkane and aryl halide derivatives generally. Reaction E is an example of a class of compounds encountered as industrial waste by-products for which there is presently no safe method of decomposition and elimination; the nitrogen containing reaction products may also include other nitrogen oxide compositions in addition to that specifically identified. Reaction F illustrates the complete decomposition of organic carboxylic acids in a safe and convenient form.

Table IV is merely representative of the variety of catalytic reactions provided by the present invention. The reaction products comprise at least carbon dioxide in each ad every instance; and include other environmentally compatible products which are either non-toxic and non-hazardous or can be neutralized or otherwise converted quickly and easily into environmentally compatible products.

To further describe the subject matter as a whole comprising the catalytic process of the present invention, a variety of different experiments performed in the laboratory will be described. These laboratory scale experiments will serve to merely illustrate the diversity of applications, fluids, and organic materials which can be catalytically degraded by the present process. While the equipment and experimental design is solely in laboratory scale terms, it is clear that these parameters can be expanded at will to meet industrial and commercial scale operations. In addition, it will be expressly understood that while a limited number of different organic materials are degraded using only the preferred transition element catalyst, hydrogen peroxide and photoenergy, these empirical details do not either restrict or limit the present invention in any way. To the contrary, these empirical experiments are merely representative of the number, variety, and diversity of organic materials and reactive conditions which can be advantageously employed using the present catalytic process.

EXPERIMENTAL DESIGN AND GENERAL PROTOCOL

The experiments described hereinafter employ the preferred solid catalyst, Degussa P25 $TiO_2$, either as an aqueous slurry which was coated fully onto a solid support material (such as the internal surface of the reaction cell wall); or as an aqueous slurry which was partly coated onto a solid support and partly dispersed in the fluid reaction medium; or as a suspension completely dispersed into the fluid reaction medium alone. There is no meaningful difference in the quality or quantity of reaction products obtained via the positioning of the solid catalyst.

The fluid reaction medium contained either a single organic pollutant to be degraded or a mixture of chosen organic pollutants. The fluid of the reaction medium was either an organic solvent or water; or an aqueous dispersion of a detergent such as "Tide" sold commercially. The reactant peroxide was 30% aqueous $H_2O_2$ which was added to the fluid medium containing the organic pollutant(s). Intimate mixing of the solid catalyst with the fluid medium, the organic pollutant(s), and the $H_2O_2$ was obtained by mechanical means.

The reaction cell was protected from extraneous light by careful masking of the exterior surfaces except when irradiation was by fluorescent room light. Photoenergy was supplied to the fluid reaction medium either internally or externally through the reaction cell wall using one of the following lamps: Hg-Ar or a fluorescent room lamp. Typical loading of the solid catalyst varied from 0.1–1.0 grams (hereinafter "g") per 100 milliliter (hereinafter "ml") of fluid reaction mixture.

The progress of the reactions was empirically monitored by routinely measuring the amounts of organic pollutants remaining within the reaction cell. The organic pollutants were detected, identified, and quantified by gas chromatography. The gas chromatography apparatus included a 6 foot by ⅛ inch stainless steel column packed with 20% Carbowax 20M on diatomaceous earth fitted into a Perkin-Elmer Sigma 300 gas chromatograph using a flame ionization detection system. Carbon dioxide evolving from the reaction cell via the degradation of organic pollutants was identified and quantified with this gas chromatography apparatus using a similar column packed with Porapak-N material and a thermal conductivity detector. Chloride ion yielded from mineralization of halo-organic pollutants within the reaction cell was detected using an Orion chloride-ion-selective electrode in conjunction with a Radiometer PHM-85 meter. The presence of peroxide was detected by decolorization of acidified $KMnO_4$. The individual procedures and conditions of assay for each of these analytical methods and apparatus is known and conventional in the art; accordingly, it is deemed that none of their assay specifics or details need be recited herein.

Experiment 1

About 1.0 grams of Degussa P25 $TiO_2$ powdered catalyst was slurried into about 20.0 ml of water and this prepared slurry was coated onto the interior surfaces of a glass cylinder which served as the reaction cell. The glass cylinder was rotated by hand to evenly cover the interior surfaces followed by air evaporation of the slurry water. After the coated catalyst was completely dry, a fluid mixture containing 1.0 ml of trichloroethylene (hereinafter "TCE"), 90 ml of acetone, and 10 ml of 30% aqueous $H_2O_2$ was introduced into the coated cylinder. A 25 watt low-pressure quartz-enclosed mercury-argon lamp was then immersed in the fluid mixture of reactants and the reaction cell enclosed in aluminum foil. The fluid reaction mixture was then irradiated for 1.0 hour's duration at room temperature (20° C.). Analysis of the fluid reaction mixture after 1 hour of irradiation demonstrated a complete disappearance of TCE. The formation of carbon dioxide and chloride ion as the sole reaction products was confirmed by gas chromatography and ion-selective potentiometry respectively.

Experiment 2

Purposely contaminated granular activated carbon (hereinafter "GAC") was prepared as follows: 58 milliliters (hereinafter "ml") of an aqueous solution containing 39 milligrams per liter (hereinafter "mg/L") of TCE was passed through a column of 5.0 grams of GAC at a rate of about 3-7 drops per minute such that the residence time of the TCE solution within the GAC column was about 15 minutes duration. The effluent obtained from the GAC column was empirically found to contain 1.7 mg/L of TCE The TCE-adsorbed GAC column was then first washed with 45 ml of acetone as an eluent passing through the length of the column. The acetone effluent was collected and the GAC column then washed free of acetone by elution with water alone. The twice washed GAC column was found to be completely free of the TCE load previously introduced; almost all the originally adsorbed TCE from the column was empirically verified as being present in the acetone effluent.

The interior surfaces of a glass cylinder reaction cell were coated with Degussa P25 $TiO_2$ catalyst in the manner described within Experiment 1. Into this catalyst coated reaction cell were introduced all the acetone effluent containing dissolved TCE and 10 ml of 10% $H_2O_2$ as a reaction mixture. The mercury-argon lamp of Experiment 1 was then inserted into the glass cylinder; the reaction cell enclosed in aluminum foil; and the reaction mixture mechanically stirred and irradiated for 1 hour's duration at room temperature (20° C.). Subsequent analysis showed a complete disappearance of TCE and the formation of chloride ion.

Experiment 3

The column of GAC regenerated by Experiment 2 was used to adsorb a second prepared aqueous solution containing 71 mg/L of TCE. 20 ml of the 71 mg/L TCE olution was passed through the 5.0 gram column of regenerated GAC at a rate of about 3-7 drops per minute such that the residence time of the TCE solution within the regenerated GAC column was about 15 minutes duration. The effluent obtained from the regenerated GAC column was empirically found to contain 10 mg/L of TCE. The regenerated GAC column was therefore demonstrated to maintain almost all the original adsorption activity of fresh, previously unused GAC.

Experiment 4

Fresh GAC was purposely contaminated with TCE and then washed with acetonitrile as described in Experiment 2 for washing with acetone. The acetonitrile effluent was collected and the GAC column then washed with water to remove all traces of the acetonitrile. Almost all the originally adsorbed TCE from the column was empirically confirmed as being in the acetonitrile effluent.

The interior surfaces of a glass cylinder reaction cell were coated with Degussa P25 $TiO_2$ catalyst in the manner previously described within Experiment 1. Into this catalyst coated reaction cell were introduced all the acetonitrile effluent containing dissolved TCE and 10 ml of 30% $H_2O_2$ to form a reaction mixture. The mercury-argon lamp of Experiment 1 was then inserted into the glass cylinder; the reaction cell enclosed in aluminum foil; and the reaction mixture stirred mechanically and irradiated for 1 hour's duration at room temperature. Subsequent analysis revealed the complete decomposition of TCE. In addition, the total quantity of acetonitrile effluent introduced into the reaction cell was completely recovered.

Experiment 5

Fresh GAC was purposely contaminated with TCE and then washed with methanol as described earlier in Experiment 2 for washing by acetone. The methanol effluent was collected and the GAC column then washed with water to remove all traces of the methanol. Almost all the originally adsorbed TCE from the column was empirically confirmed as being in the methanol effluent.

The interior surfaces of a glass cylinder reaction cell were coated with Degussa P25 $TiO_2$ catalyst in the manner previously described within Experiment 1. Into this catalyst coated reaction cell were introduced all the methanol effluent containing dissolved TCE and 10 ml of 30% $H_2O_2$ to form a reaction mixture. The mercury-argon lamp of Experiment 1 was then inserted into the glass cylinder; the reaction cell enclosed in aluminum foil; and the reaction mixture stirred mechanically and irradiated for 1 hour's duration at room temperature.

Subsequent analysis revealed the complete decomposition of TCE.

Experiment 6

About 0.1 gram of Degussa P25 $TiO_2$ powdered catalyst was slurried in 5.0 ml of acetonitrile and deposited onto the interior surfaces of a glass cylinder. Into this catalyst-coated cylinder was introduced: a fluid mixture of four pollutants containing 1.0 ml each of isooctane, benzene, 1,2-dichloroethane (hereinafter "DCE"), and chlorobenzene; 10 ml of 30% aqueous $H_2O_2$; and a volume of acetonitrile sufficient to make 100 ml of reaction mixture. A 25 watt quartz enclosed Hg-Ar low-pressure lamp was immersed into the reaction mixture; the reaction cell enclosed in aluminum foil; and the reaction mixture stirred mechanically and irradiated for 6 hours duration. The reaction mixture was monitored and analytically evaluated for organic material content at 2 and 6 hours irradiation time. The results of organic material degradation are summarized by Table V below.

TABLE V

| TIME (hours) | PERCENTAGE OF ORGANIC MATERIAL REMAINING | | | |
|---|---|---|---|---|
| | ISOOCTANE | BENZENE | (DCE) DICHLOROETHANE | CHLOROBENZENE |
| 2 | 100% | 79% | 37% | 65% |
| 6 | 39% | 65% | 20% | 55% |

Experiment 7

About 0.5 gram of Degussa P25 $TiO_2$ powdered catalyst was slurried in 5.0 ml of acetonitrile and deposited onto the interior surfaces of a glass cylinder. Into this catalyst-coated cylinder was introduced: a fluid mixture of four pollutants containing 1.0 ml each of isooctane, benzene, 1,2-dichloroethane (hereinafter "DCE"), and chlorobenzene; and a volume of acetonitrile sufficient to make 100 ml of reaction mixture. In contrast to the reaction mixture of Experiment 6, the use of $H_2O_2$ as a reactant was purposefully omitted. Only molecular oxygen provided by the ambient air was present. A 25 watt quartz enclosed Hg-Ar low-pressure lamp was then immersed into the reaction mixture; the reaction cell enclosed in aluminum foil; and the reaction mixture stirred mechanically and irradiated for 6 hours duration. The reaction mixture was monitored and analytically evaluated for organic material content at 2 and 6 hours irradiation time. The results of organic material degradation are summarized by Table VI below.

TABLE VI

| TIME (hours) | PERCENTAGE OF ORGANIC MATERIAL REMAINING | | | |
|---|---|---|---|---|
| | ISOOCTANE | BENZENE | (DCE) DICHLOROETHANE | CHLOROBENZENE |
| 2 | 100% | 100% | 100% | 100% |
| 6 | 100% | 100% | 100% | 100% |

In each instance there was no appreciable degradation of any organic material pollutant in the absence of $H_2O_2$ from the reaction mixture. It is therefore unequivocally demonstrated by a comparison of the empirical data of Tables V and VI that the mineralization of organic material pollutants by the instant process will not proceed in the absence of peroxide as a reactant despite the presence of a solid transition element catalyst and photoenergy at wavelengths absorbable by the catalyst.

Experiment 8

About 0.1 gram of Degussa P25 $TiO_2$ powdered catalyst was combined with 10 ml of 30% $H_2O_2$ and 90 ml of a saturated solution of five pollutants in water containing: 0.0016% (v/v) isooctane, 0.034% (v/v) benzene, 0.021% (v/v) trichloroethylene (hereinafter "TCE"), 0.32% (v/v) 1,2-dichloroethane, and 0.042% (v/v) chlorobenzene. This reaction mixture was then introduced into a glass cylinder reaction cell and mechanically stirred. A 25 watt quartz enclosed Hg-Ar low-pressure lamp was then immersed into the reaction mixture; the reaction cell enclosed in aluminum foil; and the reaction mixture mechanically stirred and irradiated for 2.5 hours duration. The reactants of the mixture were analytically identified and evaluated after 2.5 hours irradiation time. The results are summarized by Table VII below.

TABLE VII

| TIME (hours) | PERCENTAGE OF ORGANIC MATERIAL REMAINING | | | | |
|---|---|---|---|---|---|
| | ISOOCTANE | BENZENE | TCE | DCE | CHLOROBENZENE |
| 2.5 | 0% | 0% | 0% | 25% | 0% |

Experiment 9

The reaction mixture described within Experiment 8 was again prepared. About 0.1 gram of Degussa P25 $TiO_2$ powdered catalyst was combined with 10 ml of 30% $H_2O_2$ and 90 ml of a saturated solution in water of five pollutants containing: 0.0016% (v/v) isooctane, 0.021% (v/v) trichloroethane, 0.034% (v/v) benzene, 0.32% (v/v) 1,2-dichloroethane, and 0.042% (v/v) chlorobenzene. This reaction mixture was then introduced nto a glass cylinder reaction cell and mechanically stirred. In this instance, however, irradiation was solely by ordinary fluorescent room light through the reaction cell wall for 20.0 hours duration. The reaction mixture was analytically identified and evaluated for organic material content after 20 hours fluorescent light irradiation time. The results are summarized by Table VIII below.

TABLE VIII

| TIME | PERCENTAGE OF ORGANIC MATERIAL REMAINING | | | | |
|---|---|---|---|---|---|
| (hours) | ISOOCTANE | BENZENE | TCE | DCE | CHLOROBENZENE |
| 20.0% | 0% | 0% | 0% | 40% | 0% |

Experiment 10

About 0.1 gram of Degussa P25 $TiO_2$ powdered catalyst was combined with 10 ml of 30% $H_2O_2$ and 90 ml of a detergent emulsified and dispersed saturated solution of five pollutants in water containing: 1.0 ml of liquid "Tide" (as commercially sold), 0.29% (v/v) isooctane, 0.23% (v/v) benzene, 0.33% (v/v) trichloroethane, 0.25% (v/v) 1,2-dichloroethane, and 1.10% (v/v) chlorobenzene. In comparison to the initial concentrations of these five organic pollutants as employed within Experiments 8 and 9, the initial pollutant concentrations in this reaction mixture ranged from a very similar value for DCE to about 180 times the concentration value for isooctane. This highly concentrated, detergent-dispersed reaction mixture was then introduced into a glass cylinder reaction cell; enclosed in aluminum foil; and mechanically stirred. Again as described in Experiment 8, irradiation was by a 25 watt quartz enclosed Hg-Ar low pressure lamp immersed into the reaction cell. In this instance, however, irradiation was for 4.5 hours duration. The contents of the concentrated, detergent-dispersed reaction mixture were analytically identified and evaluated after 2.5 and 4.5 hours respectively of irradiation time. The results are summarized by Table IX below.

TABLE IX

| TIME | PERCENTAGE OF ORGANIC MATERIAL REMAINING | | | | |
|---|---|---|---|---|---|
| (hours) | ISOOCTANE | BENZENE | TCE | DCE | CHLOROBENZENE |
| 2.5 | 14% | 22% | 16% | 60% | 22% |
| 4.5 | 1% | 13% | 5% | 46% | 4% |

Experiment 11

This experiment is similar to Experiment 10 previously described except that no solid catalyst of any kind was employed either in the reaction mixture or during the reaction process. Instead, the prepared reaction mixture contained only the combination of 10 ml of 30% $H_2O_2$ and 90 ml of a detergent emulsified and dispersed saturated solution of five pollutants in water containing: 1.0 ml of liquid "Tide" (as commercially sold), 0.29% (v/v) isooctane, 0.23% (v/v) benzene, 0.33% (v/v) trichloroethylene, 0.25% (v/v) 1,2-dichloroethane, and 1.10% (v/v) chlorobenzene. As in Experiment 10, in comparison to the initial concentrations of these five organic pollutants within Experiments 8 and 9, the initial pollutant concentrations in this reaction mixture ranged from a very similar value for DCE to about 180 times the concentration value for isooctane. This highly concentrated, detergent-dispersed reaction mixture without any transition element catalyst was then introduced into a glass cylinder reaction cell which was enclosed in aluminum foil and mechanically stirred. Again as described in Experiment 10, irradiation was by a 25 watt quartz enclosed Hg-Ar low pressure lamp immersed in the reaction cell for 4.5 hours duration. The contents of the concentrated, detergent-dispersed reaction mixture without solid catalyst were analytically identified and evaluated after 2.5 and 4.5 hours respectively of irradiation time. The results are summarized by Table X below.

TABLE X

| TIME | PERCENTAGE OF ORGANIC MATERIAL REMAINING | | | | |
|---|---|---|---|---|---|
| (hours) | ISOOCTANE | BENZENE | TCE | DCE | CHLOROBENZENE |
| 2.5 | 89% | 65% | 59% | 84% | 88% |
| 4.5 | 89% | 65% | 59% | 84% | 88% |

In each instance, the presence of $H_2O_2$ alone without a solid transition element catalyst in a detergent-dispersed reaction mixture of five pollutants failed to effectively degrade each of the pollutant organic materials over the 4.5 hour reaction period. Comparison of the empirical data presented by Tables IX and X clearly demonstrates the need for and advantages of a solid, transition element catalyst such as Degussa P25 $TiO_2$.

It is deemed important also to emphasize that Experiments 10 and 11 were each conducted using detergent-emulsified dispersions containing concentrations of pollutant organic materials between ten and one thousand times the concentration accessible by their dissolution in water alone in the absence of detergent. Moreover, a comparison of the empirically obtained data shows that pollutant degradation reactions in the presence of $TiO_2$ were substantially faster than reactions in which the catalyst was absent; and that no additional decomposition of pollutants took place between 2.5 and 4.5 hours in detergent emulsified reactions conducted in the absence of $TiO_2$. Alternatively, in those detergent dispersed reaction mixtures when $TiO_2$ was present, degradation of organic pollutants occurred through the entirety of the test period—4.5 hours.

Experiment 12

A reaction mixture was prepared which was a combination of 0.5 gram of powdered Degussa P25 $TiO_2$, 10 ml of 30% $H_2O_2$, and 90 ml of a detergent free saturated solution of three pollutants in water containing 0.5 ml each of: isooctane, benzene, and chlorobenzene. The amounts of these three organic pollutants within the prepared reaction mixture were far in excess of their individual solubilities in water; each pollutant was present in the main as droplets kept in suspension by mechanical stirring. The amounts of each pollutant initially present compared to the amount present in Experiments 10 and 11 where they were detergent-dispersed were: for isooctane, 170%; for benzene, 220%; and for chlorobenzene, 45%. This mixture was introduced into a glass cylinder reaction cell which was enclosed in aluminum foil and mechanically stirred throughout the degradation process. Irradiation was by a 25 watt quartz enclosed Hg-Ar low pressure lamp immersed in the reaction cell for 4.5 hours duration. The contents of the droplet-containing, aqueous reaction mixture were analytically identified and evaluated after 4.5 hours of irradiation time. The results are summarized by Table XI below.

TABLE XI

| TIME | PERCENTAGE OF ORGANIC MATERIAL REMAINING | | |
|---|---|---|---|
| (hours) | ISOOCTANE | BENZENE | CHLOROBENZENE |
| 4.5 | 35% | 65% | 46% |

In each instance, the empirical data clearly demonstrates that even the high levels of organic pollutants maintained as droplets in suspension by mechanical stirring are decomposed in meaningful quantities within 4.5 hours using hydrogen peroxide and a solid transition element catalyst in combination.

APPLICATIONS

Following is a non-exhaustive list of applications for the previously described technology and the economic significance of these applications.

Today, the primary methods of disposing of hazardous waste are through landfill and incineration with the overwhelming majority of waste being landfilled. Intermediate treatment steps used extensively in the clean up of drinking water and wastewater are air-stripping and treatment via carbon adsorption. A key weakness of air-stripping and of carbon adsorption is that these are non-destructive technologies. Thus, air-stripping converts a liquid contamination problem into an air pollution problem and carbon adsorption produces a hazardous solid which cannot be directly landfilled in the United States after 1988. Consequently, pressure for elimination of the pollution hazard will lead continually away from non-destructive processes toward destructive ones which should, ideally, produce a totally harmless effluent. However, technologies that destroy hazardous materials must also accomplish this task at an economically competitive cost. The present invention accomplishes this task by offering a means to destroy hazardous organics at a cost significantly below the state-of-the-art technology as is illustrated by the following examples.

(1) One of the most widely used technologies in the treatment of drinking water and wastewater is granular activated carbon (GAC). Several examples of organic contaminants that are increasingly found in water include a wide variety of molecules ranging from hydrocarbons, pesticides, di- and trihalomethanes, PCBs, chlorinated dioxins, and various solvents. While GAC is very effective in removing hazardous organics from liquid and gas streams the GAC eventually becomes saturated with the hazardous material and must be treated itself. Today, contaminated GAC is either landfilled or regenerated via a thermal process. This regeneration or landfill is one of the most costly steps in the use of GAC. Ability to landfill hazardous materials will be ending in the near future due to U.S. Government legislation. Due to an ever decreasing number of available landfills, the cost to landfill is increasing dramatically. Transportation costs of hauling the contaminated GAC are also rising significantly and numerous governmental units are passing legislation to prohibit the hauling of hazardous waste through their towns, cities, and states. While thermal regeneration of GAC is an alternative to landfills, it can be very expensive. First, the GAC must be physically removed from its tower container and transported to a regeneration facility. In almost all cases, except for very large municipal facilities, the regeneration furnaces are located off-site requiring transportation and associated costs. Thermal regeneration is very capital intensive and requires a significant investment in capital equipment as well as operation and maintenance. Location of thermal regeneration facilities is also a very sensitive issue with local communities. During the thermal regeneration process up to 10% of the GAC is destroyed. Finally, additional costs are incurred in hauling the GAC back to the treatment location and reinserting it into the tower container.

The present invention offers the ability to regenerate GAC in-situ, and eliminate the need for thermal regeneration. With the technology described herein, the GAC is regenerated by first extracting the contaminants from the GAC with an appropriate solvent. This could be accomplished without removing the GAC from its container. The contaminated solvent is then removed from the GAC container and is treated by the method of the present invention.

The contaminants are thus destroyed on site which eliminates the cost and concerns associated with transporting hazardous materials. Also, the GAC is not removed from its container which eliminates this major cost component. The capital cost for furnaces and related operating and maintenance costs are eliminated. Finally, the necessity to landfill has been removed. This non-thermal regeneration will cost a fraction of what is presently spent for either landfill or thermal regeneration.

(2) One of today's major hazardous waste problems is what to do with the millions of tons of solid hazardous waste produced each year. These solids which have become contaminated include sludge, soil, and other collected waste including clothing and materials. As an example of this problem, the EPA estimates that there are 1-1.5 million large capacity motor fuel and chemical underground storage tanks in the United States. They presently project that 15-20% of those tanks are leaking. It should be noted that these numbers do not include the millions of mid to small size underground storage tanks that exist across the country. Each leaking tank results in two problems. First, if the leaking contaminant reaches an underground water aquifer, ground water clean up activities must be initiated which usually rely extensively on GAC (see example 1 above). Second, the soil itself that has become contaminated must either be treated or removed. Today the majority of contaminated soil removed from gasoline station sites is transported to landfills; however, landfill capacity is decreasing rapidly and will be closed to direct landfill of hazardous waste after 1988. Incineration to remove the organic contaminants is an alternative but includes significant transportation costs to get the soil to an incineration facility and there is presently a significant lack of capacity for incineration. With strong public resistance to the construction of incineration facilities this lack of capacity will continue to be a problem.

The technology described herein offers the ability to treat contaminated soil, sludges, and other collected wastes in-situ and eliminates the need for incineration. If a particular material still needs to be landfilled as in the case of sludges, the hazardous organic will cleansed from the sludge prior to disposal. In the example of the leaking underground gasoline tank, the contaminated soil will be treated on-site. The contaminants will be extracted from the soil using one of a number of standard approaches resulting in the contaminants being obtained in a fluid state. This contaminated fluid will then be treated by the described technology and will result in the complete destruction of the hazardous organics. Following this decomposition process, the soil will be cleansed of the contaminants and can be left on site. The cost to transport the hazardous material and its landfill have been eliminated. The process will cost a fraction of the amount required for the soil's transportation and disposal. (3) A number of industries produce hazardous organics as by-products of their production processes or have used hazardous materials such as PCBs that must now be disposed. Today, these hazardous materials are either landfilled or incinerated. As described above, the ability to landfill will be closed in the near future. Incineration is expensive and there is a lack of capacity to meet the demand in light of the elimination of landfill as an alternative. Also, both landfill and incineration require considerable transportation costs.

The technology described herein offers the ability to treat hazardous organic materials directly and eliminates the need for landfill or incineration. Furthermore, the technology is readily adaptable to mobile facilities which significantly facilitates the ability to treat hazardous materials at their source thus eliminating the need for costly and potentially troublesome transportation of hazardous materials. The unique process of the present invention would accomplish this task at a fraction of the cost presently paid to landfill or incinerate hazardous material.

(4) One of the more widely used methods in the treatment of industrial wastewater is separation technology which is designed to clean a wastewater stream of globules of hazardous organics such as hydrocarbons, oils, and solvents. While these separators have been successfully employed for a number of years, their effectiveness is rapidly diminishing as federal and state regulations become increasingly more strict regarding allowable levels of contaminants in the effluent coming from industrial sources. The problem with separation technology is that it cannot remove organics that are dissolved or dispersed in the water stream. While GAC would be an effective polishing step for cleaning the effluent, in many cases it is not economically viable especially in the case of industrial sources that produce relatively small amounts of effluent.

The technology described herein offers the ability to polish water streams in a more cost-effective anner than by using GAC. In this system, the present process would be utilized in a chamber where contaminated water that has been pretreated is passed over a catalyst in the presence of light and the appropriate degradation agent. In this manner, the organic contaminants will be destroyed.

By avoiding the need for GAC and its regeneration and/or disposal, the above described technology offers the potential to more economically clean effluent streams of hazardous organic contaminants. By destroying the organic contaminants at the pollution source, the effluent which flows into general municipal systems will be much cleaner therefore reducing subsequent clean up costs further downstream. By being able to easily retrofit such technology on to well established and reasonably priced separation systems, both large and small industrial producers of contaminated effluent will have a cost effective device in which to control the effluent which they discharge.

The present invention is not to be restricted in form nor limited in scope except by the claims appended hereto.

What we claim is:

1. A catalytic process for the degradation of an undesired organic material into environmentally compatible products without need for pretreating the organic material to be degraded, said process comprising the steps of:
   obtaining the undesired organic material to be degraded in a fluid state;
   combining said fluid organic material in the presence of water with a solid catalyst comprising at least one transition element and a peroxide as a reaction mixture; and
   adding photoenergy absorbable by said catalyst to said reaction mixture to yield environmentally compatible reaction products comprising at least carbon dioxide.

2. The catalytic process as recited in claim 1 wherein said fluid organic mixture is obtained by:
   mixing the organic material to be degraded with a fluid carrier to form a fluid mixture; and
   adding water to said fluid mixture.

3. The catalytic process as recited in claim 1 wherein said fluid organic material is obtained by mixing a water-containing organic material with a fluid carrier.

4. The catalytic process as recited in claim 1 wherein said fluid organic material is obtained as a fluid mixture of water and the organic material to be degraded.

5. The catalytic process as recited in claim 1 wherein said fluid organic material comprises an organic liquid.

6. The catalytic process as recited in claim 1 wherein the organic material to be degraded comprises a mixture of different compositions.

7. The catalytic process as recited in claim 6 wherein said mixture includes solid particulate matter.

8. The catalytic process as recited in claim 7 wherein said solid particulate matter comprises granular, activated carbon.

9. The catalytic process as recited in claim 1 wherein said organic material comprise synthetic materials.

10. The catalytic process as recited in claim 9 wherein said synthetic materials are selected from the group consisting of nylon, polyvinyl chloride, polyethylene, polypropylene, and polystyrene.

11. The catalytic process as recited in claim 1 wherein said fluid organic material comprises a detergent emulsified dispersion.

12. The catalytic process as recited in claim 1 wherein the organic material to be degraded comprises at least one toxic substance.

13. The catalytic process as recited in claim 1 wherein the organic material to be degraded comprises at least one non-toxic substance.

14. The catalytic process as recited in claim 1 wherein the organic material to be degraded comprises pollutants of water.

15. The catalytic process as recited in claim 1 wherein said photoenergy is selected from the group consisting of visible light wavelengths and ultraviolet light wavelengths.

16. The catalytic process as recited in claim 1 wherein at least one of said reaction products is in a gaseous state.

17. The catalytic process as recited in claim 1 wherein said solid catalyst comprises an oxide of a transition element.

18. The catalytic process as recited in claim 1 wherein said solid catalyst is titanium dioxide.

19. The catalytic process as recited in claim 1 wherein said peroxide is hydrogen peroxide.

20. A catalytic process for the purification of an organic solvent containing dissolved organic material without need for pretreating the organic solvent to be purified, said process comprising the steps of:
   obtaining an organic solvent containing dissolved organic material as an undesired impurity;
   combining said impure organic solvent in the presence of water with a solid catalyst comprising at least one transition element and a peroxide as a reaction mixture; and
   adding photoenergy absorbable by said solid catalyst to said reaction mixture to yield a substantially purified organic solvent and environmentally compatible reaction products comprising at least carbon dioxide.

21. An environmentally compatible process for regenerating granular activated carbon from exhausted granular activated carbon containing organic material, said process comprising the steps of:
   mixing the exhausted, granular activated carbon with an organic solvent such that the organic material becomes dissolved in said organic solvent and granular activated carbon is regenerated in a form substantially free of adsorbed organic material;
   separating said regenerated, granular activated carbon from said organic solvent containing dissolved organic material;
   combining said separated organic solvent with water, a solid catalyst comprising at least one transition element, and a peroxide as a reaction mixture; and
   adding photoenergy absorbable by said solid catalyst to said reaction mixture to yield an organic solvent substantially free of dissolved organic material and environmentally compatible reaction products comprising at least carbon dioxide.

22. The process as recited in claim 20 or 21 wherein said solid catalyst is an oxide of a transition element.

23. The process as recited in claim 20 or 21 wherein said solid catalyst is titanium dioxide.

24. The process as recited in claim 20 or 21 wherein said peroxide is hydrogen peroxide.

25. The process as recited in claim 20 or 21 wherein said organic solvent is acetonitrile.

26. The process as recited in claim 20 or 21 wherein said organic solvent is selected from the group consisting of alkylnitriles, N-N-dimethylacrylamides, and dialkylsulfones.

27. An environmentally compatible process for purifying potable water and industrial waste water without need for pretreating the water to be purified, said process comprising the steps of:
   obtaining water polluted with undesired dissolved organic material;
   combining said polluted water with a solid catalyst comprising at least one transition element and a peroxide as a reaction mixture; and
   adding photoenergy absorbable by said solid catalyst to said reaction mixture to yield substantially purified water and environmentally compatible reaction products comprising at least carbon dioxide.

28. An environmentally compatible process for purifying potable water and industrial waste water, said process comprising the steps of:
   obtaining water polluted with organic material;
   passing said polluted water through granular activated carbon such that said organic material is substantially adsorbed by said granular activated carbon and said water is substantially purified;
   mixing said granular activated carbon containing adsorbed organic material with an organic solvent such that said organic material becomes dissolved in said organic solvent and said granular activated carbon is regenerated in a form substantially free of adsorbed organic material;
   separating said regenerated, granular activated carbon from said organic solvent containing dissolved organic material;
   combining said separated organic solvent with water, a solid catalyst comprising at least one transition element, and a peroxide as a reaction mixture; and
   adding photoenergy absorbable by said solid catalyst to said reaction mixture to yield an organic solvent substantially free of dissolved organic material and environmentally compatible reaction products comprising at least carbon dioxide.

29. The process as recited in claim 28 wherein said organic solvent is acetonitrile.

30. The process as recited in claim 28 wherein said organic solvent is selected from the group consisting of alkylnitriles, N,N-dimethylacylamides, and dialkylsulfones.

31. The process as recited in claim 27 or 28 wherein said reaction mixture includes a detergent emulsified dispersion.

32. The process as recited in claim 27 or 28 wherein said solid catalyst is an oxide of a transition element.

33. The process as recited in claim 27 or 28 wherein said solid catalyst is titanium dioxide.

34. The process as recited in claim 27 or 28 wherein said peroxide is hydrogen peroxide.

* * * * *